United States Patent [19]

Byker et al.

[11] Patent Number: 5,202,787
[45] Date of Patent: Apr. 13, 1993

[54] ELECTRO-OPTIC DEVICE

[75] Inventors: Harlan J. Byker; William L. Tonar; Larry L. Barrett, all of Holland, Mich.

[73] Assignee: Gentex Corporation, Zeeland, Mich.

[21] Appl. No.: 819,264

[22] Filed: Jan. 10, 1992

[51] Int. Cl.$^5$ .................. G02F 1/153; G02F 1/1333; G02B 5/08

[52] U.S. Cl. .................. 359/267; 359/602; 359/74

[58] Field of Search ............ 359/265, 267, 602, 604, 359/74

[56] References Cited

U.S. PATENT DOCUMENTS

| | | | |
|---|---|---|---|
| 3,578,843 | 5/1971 | Castellion | 359/267 |
| 3,807,832 | 4/1974 | Castellion | 359/267 |
| 3,844,636 | 10/1974 | Maricle et al. | 359/267 |
| 4,664,479 | 5/1987 | Hiroshi | 359/602 |
| 4,671,617 | 6/1987 | Hara | 359/267 |
| 4,712,879 | 12/1987 | Lynam et al. | 359/267 |
| 4,820,022 | 4/1989 | Demura et al. | 359/602 |
| 4,902,108 | 2/1990 | Byker | 359/265 |
| 4,917,477 | 4/1990 | Bechtel et al. | 359/267 |
| 5,128,799 | 7/1992 | Byker | 359/265 |
| 5,148,014 | 9/1992 | Lynam et al. | 359/602 |

*Primary Examiner*—Bruce Y. Arnold
*Assistant Examiner*—Evelyn A. Lester
*Attorney, Agent, or Firm*—Malcolm R. McKinnon

[57] ABSTRACT

Electro optic devices incorporating an improved configuration of elements which dramatically reduces light scattering and haziness with relatively inexpensive coated glass. The devices are liquid or gel containing electro optic devices, such as an electrochromic automatic rearview mirror for automotive vehicles, which has for at least one of its walls a sheet of glass coated with a transparent conductive coating. The combination of the coated glass, which has a tendency to have an optically rough surface, and the liquid or gel electro optic material reduces the scattering of any incident light by wetting out the rough optical surface of the coated glass, thereby improving the optical quality. The coated glass scatters between 0.2 and 4.0% of visible white light prior to assembly into the device.

15 Claims, 1 Drawing Sheet

ELECTRO-OPTIC DEVICE

BRIEF SUMMARY OF THE INVENTION

Transparent electronic conductive materials are useful and often essential in electro-optic devices such as electrochromic automatic rearview mirrors for automotive vehicles as well as in other devices such as liquid crystal, electrophoretic, di-polar suspension displays and the like. Transparent electronic conductive materials are typically comprised of very thin metal films or thin metal oxide films deposited on transparent substrates such as glass or plastic. The metal oxides are often degenerate semiconductors, as for example, tin-doped indium oxide, nonstoichimetric $CdSnO_4$, fluorine-doped tin oxide and aluminum-doped zinc oxide. These thin film materials are generally prepared by physical vapor deposition methods such as electron beam evaporation or planar magnetron sputtering or by chemical deposition by the pyrolysis of gases, liquids or solids sprayed onto a hot substrate. Some chemical deposition methods have been developed for use in high volume production of transparent electronic conductive thin films on glass, and because of this high volume production, the coated glass can be produced in a very economical manner.

One drawback of some of the high volume processes is the haze or light scattering nature of the transparent conductive films produced. A possible reason for the haze is the microscopic surface roughness of the coatings produced at high temperatures when the coatings are formed by one of the chemical deposition techniques. Whatever the cause, some economically attractive coatings scatter between 0.2 and 4.0% of the visible light passing through the coating. However, for the high quality optical clarity required, for example, in an electrochromic rearview mirror for automotive vehicles or in many electro-optic window and display applications, the haziness of the coating is considered to be a fatal drawback to their commercial use in these applications.

Surprisingly, the inventors of the present invention have discovered that with solution-phase electrochromic devices in which the hazy transparent conductive coatings are in contact with a liquid or gel with an index of refraction higher than air, the light scattering is reduced to completely acceptable levels for commercial use in the aforementioned as well as other applications.

An object of the present invention is to overcome disadvantages in prior electro-optic devices and to provide an improved liquid or gel containing electro-optic device which uses as at least one of its walls a sheet of glass which is coated with a transparent conductive coating which has enough haze to scatter between 0.2 and 4.0% of the visible white light passing through the coated glass in air prior to assembly into the device thereby enabling a substantial reduction in the cost of manufacturing the electro-optic device.

Another object of the present invention is to provide an improved liquid or gel containing electro-optic device which enables the use of low cost coated glass and which provides high optical quality acceptable for commercial use.

Another object of the present invention is to provide an improved electrochromic automatic rearview mirror for automotive vehicles incorporating improved means which reduces light scattering of relatively inexpensive coated glass incorporated therein to levels acceptable for commercial use.

Another object of the present invention is to provide an improved electro-optical device incorporating improved means effective to reduce light scattering and haziness usually apparent in relatively inexpensive coated glass thereby increasing the commercial viability of electro-optical devices embodying such inexpensive coated glass.

Another object of the present invention is to provide an improved electro-optic device incorporating improved means which dramatically reduces light scattering and haziness in relatively inexpensive coated glass thereby enabling a reduction in the cost of manufacturing the device.

The above as well as other objects and advantages of the present invention will become apparent from the following description, the appended claims and the accompanying drawings.

BRIEF DESCRIPTION OF THE DRAWINGS

FIG. 2 shows, by cross-hatched area 14, the portion of planar, transparent side 100 of the device, which overlays the solution of reversibly variable transmittance in the device and which, consequently, changes color, or changes from clear to dark and back, as the device is operated.

DETAILED DESCRIPTION

Figure 1:
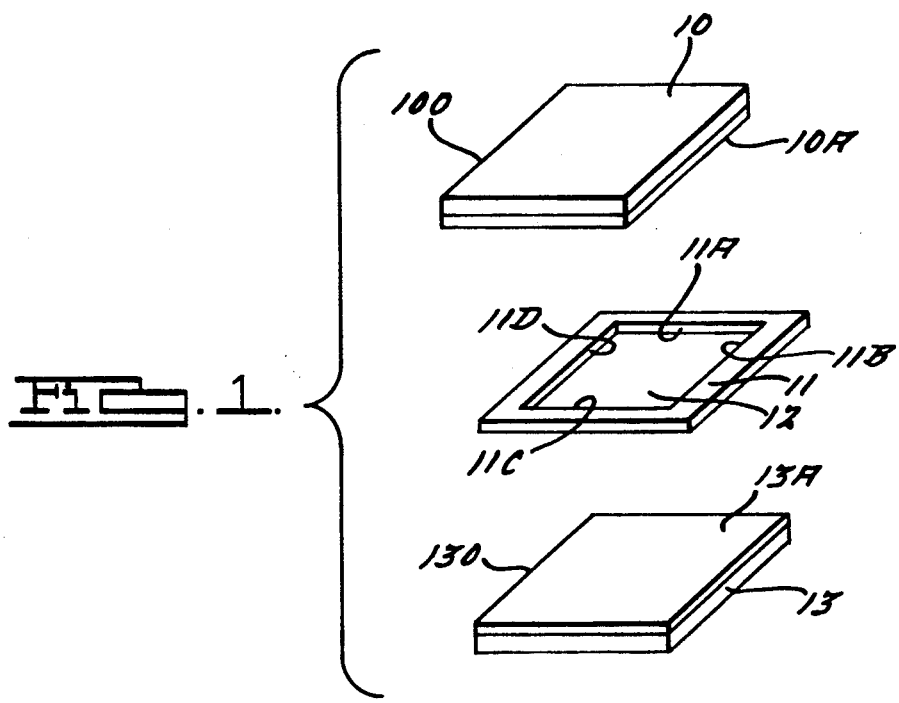
FIG. 1 displays schematically an exploded view of two planar, transparent, electrode-bearing sides 100 and 130, of a device embodying of the invention together with spacer or separating means 11, which holds the electrode-bearing sides apart and in substantially parallel relationship in an assembled device, and the inside edges 11A, 11B, 11C and 11D of which, together with the electrode layers 10A and 13A, of the electrode-bearing sides, define a space, 12 which, in an assembled device of the invention, is occupied by a solution according to the invention that is in contact with the electrode layers.

In accordance with the present invention, a liquid or gel containing electro-optic device is provided which uses as at least one of its walls a sheet of glass that is coated with a transparent conductive coating which has enough haze to scatter between 0.2 and 4.0% of the visible white light passing through the coated glass in air prior to assembly into a device embodying the invention. Economical coating processes such as those which deposit transparent conductive coatings on glass during the manufacture of the glass itself often result in somewhat coarse, rough coatings. This is especially true when the sheet resistance of the coatings is in the range of 1–40 ohms per square which is preferred when the device made using this coated glass is a solution-phase electrochromic rearview mirror for use on motor vehicles. Although the coated glass is attractive for use in electro-optic devices because of its low cost, the surface roughness (even microscopic surface roughness) can result in a portion of the visible light passing through the coating being scattered, thus making the coated glass appear hazy. This type of coated glass is therefore an unobvious choice for use in a high quality electro-optical device, such as an electrochromic automatic rearview mirror for automotive vehicles, in which significant light scattering or haziness can render the device unacceptable for commercial use.

The inventors of the present invention have discovered, unexpectedly, that liquid or gel containing electro-optic devices can be made utilizing the aforementioned type of coated glass whereby the electro-optic devices have high optical quality and are acceptable for commercial use. It has been found that when the liquid or gel comes in contact with the rough surface of the transparent conductive coating on the glass, the liquid or gel "wets out" the surface and dramatically reduces the light scattering. The index of refraction difference between the coating surface and the ambient air is larger than the index of refraction difference between the coating surface and the liquid or gel. Therefore the amount of light reflected in various directions from the randomly oriented facets on the coating surface is reduced when the coating is in contact with the liquid or gel. The discovery that this wetting out process is effective enough in reducing the light scattering and the haziness in the devices embodying the invention has significant economical impact on the commercial viability of the devices embodying the invention.

Electrochromic mirrors of the type disclosed in detail in U.S. Pat. No. 4,902,108, issued Feb. 20, 1990, for Single-compartment, Self-erasing, Solution-phase Electrochromic Devices, Solutions For Use Therein, And Uses Therefore, and assigned to the assignee of the present invention, are incorporated in the preferred embodiments of the present invention, and the entire disclosure of U.S. Pat. No. 4,902,108 is incorporated herein by reference. The most preferred embodiments of the invention are solution-phase electrochromic devices for use as rearview mirrors on motor vehicles, which devices utilize at least one piece of transparent conductor coated glass which, prior to assembly into the mirror, scatters between 0.2 and 4.0% of the visible white light passing through the coated glass. While solution-phase electrochromic devices are the preferred devices of the invention, devices of the invention may also contain liquid crystals or other liquid, gel or polymeric electro-optic materials which "wet out" the transparent conductive coating and which provide commercially optically acceptable devices from the standpoint of light scatter or haze.

Another discovery related to the use of coated glass with light scattering coatings for solution-phase electrochromic devices is that epoxy seals used in these devices have a greater life expectancy when exposed to high temperature and high humidity. This may be due to the increased surface area for bonding due to the surface roughness of the coating. It has also been demonstrated that glass coated with fluorine-doped tin oxide during the manufacture of the glass itself can be press-bent so that the coating ends up either on the concave or convex side of the glass without significantly affecting the sheet resistance or light transmission properties of the tin oxide coating. This has significant advantages in the fabrication of convex, electrochromic rearview mirrors.

Referring to the drawings, and as described in greater detail in the aforementioned U.S. Pat. No. 4,902,108, as incorporated herein by reference, the basic structural elements of a typical device embodying the invention are illustrated in FIG. 1 in an exploded view. These elements include two planar electrode-bearing sides or walls 100 and 130, a spacing or separating layer 11, which spaces apart and holds the walls 100 and 130 in substantially parallel relationship in an assembled device, and surrounds a space or volume 12. The volume 12 is defined, in an assembled device, by electrode layers 10A and 13A of the electrode-bearing walls 100 and 130, respectively, as well as the four inside walls 11A, 11B, 11C and 11D of the layer 11. In FIG. 1, the inside walls 11B and 11C are hidden from view. The electrode layers 10A and 13A in the unassembled condition have enough haze to scatter between 0.2 and 4.0% of the visible white light passing through the coated glass in air. In an assembled device, the volume 12 is preferably filled or nearly filled, in case room is left for expansion with temperature increase, with any of the solutions disclosed in U.S. Pat. No. 4,902,108 which have reversibly variable transmittance in operation of the device. The solution in the volume 12 is in contact with both electrode layers 10A and 13A during operation of the device. To obtain the advantages of the invention, it is not necessary that both 10A and 13A scatter between 0.2 and 4.0% of the visible white light in the unassembled condition. One of 10A or 13A may be a transparent conductor which scatters less than 0.2% or may be a relatively thick metal layer which acts both as an electrode and as a reflector surface as might be desirable for use in an electrochromic rearview mirror. Details of the structural elements illustrated in FIG. 1 are described in greater detail in U.S. Pat. No. 4,902,108 beginning at line 4, column 8 of such patent.

Figure 2:
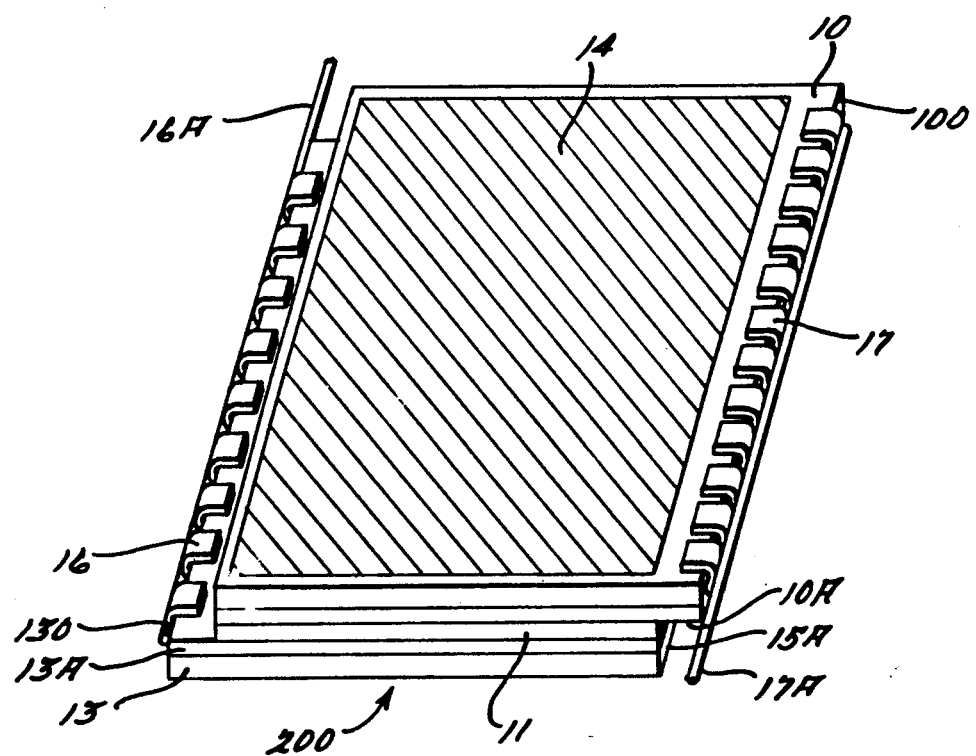
FIG. 2 illustrates schematically a partially assembled device 200, according to the invention.

With reference to FIG. 2, a preferred arrangement for connecting the electronic conductive layers to a power source is illustrated. In this arrangement, the two electrode-bearing walls are displaced in opposite directions, laterally from but parallel to the solution space, in order to provide an exposed area of 10A and 13A. Electrically conductive spring clips made of beryllium copper coated with tin are placed on the coated glass sheets 10 and 13 to make electrical contact to the exposed areas of 10A and 13A. The spring clips are shown as 16 and 17 in FIG. 2, and suitable electrical conductors, such as 16A and 17A, may then be soldered or otherwise connected to the spring clips so that desired voltage may be applied to the device from a suitable power source.

The present invention is described in greater detail in the following, non-limiting examples:

EXAMPLE 1

A device of the invention was construed from two flat pieces of 2.1 mm thick glass each of which was coated with fluorine-doped tin oxide with a sheet resistance of about 20 ohms per square. Each of the pieces of coated glass scattered about 0.6% of the white light passing through the device as determined by an XL-211 Hazeguard meter manufactured and marketed by BYK-Gardner Incorporated, Silver Spring, Md. The coated sides of the pieces of glass faced each other and the coated glass along with a thermal-cure epoxy gasket strip nearly all the way around near the perimeter of the glass pieces defined a volume for an electrochromic solution. The spacing between the co-planar pieces of coated glass was defined by glass bead spacers in the epoxy gasket strip and was about 130 microns. The device was filled, by a vacuum process, through a small void in the epoxy gasket strip with a solution comprised of propylene carbonate containing dissolved therein:

| | |
|---|---|
| 0.032M | 5, 10-dihydro-5, 10-dimethylphenazine |
| 0.032M | 1, 1'-dibenzyl-4, 4'-bipyridinium difluoroborate |
| 0.5M | ethyl-2-cyano-3, 3-diphenylacrylate |

| | |
|---|---|
| -continued | |
| 3 wt % | polymethylmethacrylate |

The void in the epoxy gasket strip was plugged with an ultraviolet cure adhesive which was then cured by exposure to ultraviolet light. Electrical contact was made to the fluorinedoped tin oxide with multi-tooth spring clips on the exposed areas or offset ledges of coated glass which extended outside the epoxy gasket seal as illustrated in FIG. 2. The device was approximately 6 cm high and 25 cm wide.

The transmission of the device for CIE Curve white light with no voltage applied was 78%. With a power supply connected to the spring clip contacts with 1.2 volts applied, the transmission through the device was 7%. The transmission was controllable to any transmission between these two levels and at all transmission levels there was amazingly little haze or light scattering from the transmitted image. Even though the unfilled device scattered about 1.2% of the white light, the device filled with the above solution with no voltage applied only scattered about 0.3% of the transmitted white light as measured with the XL-211 Hazeguard meter.

EXAMPLE 2

A device like that of Example 1 was constructed except that one of the pieces of glass, on the side opposite of the tin oxide coating, had a conventional silver mirror reflector coated on the glass surface over the area of the device. When connected to a power supply and viewed through the unsilvered, tin oxide coated piece of glass, the device could be operated as a continuously variable reflectance, (i.e. gray scale controllable), mirror. Unexpectedly, even though the coated glass by itself exhibited substantial haze due to light scattering, the variable reflectance mirror was suitable with regard to optical image quality, for use as a glare-relieving rearview mirror on a motor vehicle. This was particularly surprising since the light from following vehicle headlights, as viewed in rearview mirrors on motor vehicles at night, are very discriminating with regard to haze or the scattering of light due to coating or reflector imperfections.

EXAMPLE 3

A device like that in Example 1 except that the dimensions were 2.5 cm×2.5 cm and the spacing between the co-planar, facing transparent conducting layers was 20 microns and the space was filled with dynamic scattering liquid crystal fluid with a homeotropic alignment dopant such as ZLI-1831 available from EM Industries, Hawthorne, N.Y. When a 60 hz AC voltage of 20 to 40 volts was applied to the hazy transparent tin oxide coatings and thereby across the liquid crystal layer, the device went from a surprisingly clear, relatively haze or light scattering free state to a white frosty appearance. Larger versions of the device may have application for variable privacy glass.

EXAMPLE 4

A device like that of Example 1 was constructed with fluorine-doped tin oxide with a sheet resistance of about 13 ohms per square. Each of the pieces of coated glass scattered about 2.3% of the white light passing through each piece of glass. When assembled and filled as described in Example 1, the device functioned as a continuously variable transmission electrochromic window. Even though the unfilled device scattered about 4.6% of the white light, the filled device with no voltage applied only scattered 1.3% of the transmitted white light.

While preferred embodiments of the invention have been illustrated and described, it will be understood that various changes and modifications may be made without departing from the spirit of the invention.

What is claimed is:

1. An electro-optic device including a plurality of walls defining a compartment, at least one of said walls comprising a sheet of glass coated with a transparent electronic conductive layer such that the coated glass scatters between 0.2 and 4.0% of the visible white light passing through the coated glass when it is in contact with air.

2. A device according to claim 1 wherein the device is a solution-phase electrochromic device.

3. A device according to claim 1 wherein the device is a variable reflectance rearview mirror for use with a motor vehicle.

4. A device according to claim 3 wherein the sheet resistance of the transparent electronic conductive layer is 1–40 ohms per square.

5. A device according to claim 1 wherein the device is a solution-phase electrochromic, variable reflectance rearview mirror for automotive vehicles.

6. A device according to claim 5 wherein the sheet resistance of the transparent electronic conductive layer is 1–40 ohms per square.

7. A device according to claim 1 wherein the device is a dynamic scattering liquid crystal device.

8. A variable reflectance electro-optic device comprising as a variable transmittance component a single-compartment, self-erasing, solution-phase electrochromic device wherein the compartment is defined by at least one wall comprising a sheet of glass coated with a transparent electronic conductive layer such that the coated glass scatters between 0.2 and 4.0% of the visible white light passing through the coated glass when it is in contact with air.

9. A variable reflectance rearview mirror for automotive vehicles, said mirror comprising as a variable transmittance component a single-compartment, self-erasing, solution-phase electrochromic device wherein the compartment is defined by at least one wall including a sheet of glass coated with a transparent electronic conductive layer such that the coated glass scatters between 0.2 and 4.0% of the white light passing through the coated glass when it is in contact with air.

10. A device according to claim 9 wherein the sheet resistance of the transparent electronic conductive layer is 1–40 ohms per square.

11. A mirror according to claim 9 which has a range of reflectance from greater than 70% to less than 10%.

12. A mirror according to claim 9 wherein the electrochromic device includes electronic conductive layers and is gray-scale controllable over a range of reflectance by applying electrical potential differences between the electrode layers.

13. A mirror according to claim 9 wherein the electrochromic device comprises two planar, parallel spaced-apart electrode layers to which DC current is provided through leads connected to a DC power source.

14. A variable reflectance rearview mirror for an automotive vehicle comprising as a variable transmittance component a single-compartment, self-erasing, solution-phase electrochromic device, the compartment being defined by a plurality of walls, at least one of the walls of the compartment comprising a sheet of glass coated with a transparent electronic conductive layer such that the coated glass scatters between 0.2 and 4.0% of the visible white light passing through the coated glass when it is in contact with air, said electrochromic device including two planar, parallel spaced-apart electronic conductive layers to which electrical current is provided through leads connected to a power source, said transparent electronic conductive layer being in contact with a solution having an index of refraction higher than air, the difference in the index of refraction between the coated surface and air being larger than the difference in the index of refraction between the coated surface and the electrochromic solution.

15. A rearview mirror as set forth in claim 14 wherein said mirror has a range of reflectance from greater than 70% to less than 10%, said electrochromic device being gray-scale controllable over a range of reflectance by applying electrical potential differences between the electrode layers of the device.

* * * * *